United States Patent
Kumagai et al.

(10) Patent No.: US 10,873,739 B2
(45) Date of Patent: Dec. 22, 2020

(54) CALIBRATING METHOD AND CALIBRATION APPARATUS

(71) Applicant: KABUSHIKI KAISHA YASKAWA DENKI, Kitakyushu (JP)

(72) Inventors: Hiroshi Kumagai, Kitakyushu (JP); Takashi Motoyoshi, Kitakyushu (JP); Seiichiro Fukushima, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 84 days.

(21) Appl. No.: 16/224,817

(22) Filed: Dec. 19, 2018

(65) Prior Publication Data

US 2019/0200000 A1   Jun. 27, 2019

(30) Foreign Application Priority Data

Dec. 21, 2017  (JP) .................................. 2017-244937

(51) Int. Cl.
*H04N 13/246* (2018.01)
*G02B 26/12* (2006.01)
(Continued)

(52) U.S. Cl.
CPC ......... *H04N 13/246* (2018.05); *B23K 26/032* (2013.01); *B23K 26/082* (2015.10);
(Continued)

(58) Field of Classification Search
CPC .......................... B23K 26/707; B23K 26/0884; B23K 26/082; B23K 26/032; B23K 26/21;
(Continued)

(56) References Cited

U.S. PATENT DOCUMENTS

| | | | |
|---|---|---|---|
| 5,690,846 A | 11/1997 | Okada et al. | |
| 6,101,455 A | 8/2000 | Davis | |
| 2011/0157373 A1 | 6/2011 | Ye et al. | |
| 2017/0011501 A1* | 1/2017 | Gonzalez | G06T 7/0012 |
| 2020/0105019 A1* | 4/2020 | Boyle | H04N 5/2256 |

(Continued)

FOREIGN PATENT DOCUMENTS

| | | |
|---|---|---|
| EP | 2 070 664 A1 | 6/2009 |
| EP | 2 769 800 A1 | 8/2014 |
| JP | 08-174256 | 7/1996 |

OTHER PUBLICATIONS

Nguyen et al., "Calibrating Setups with a Single-Point Laser Range Finder and a Camera", 2013 IEEE/RSJ International Conference on Intelligent Robots and Systems, Nov. 3, 2013, pp. 1801-1806, Tokyo, Japan, XP032537912, See Cite No. 6.

(Continued)

*Primary Examiner* — Brenda C Bernardi
(74) *Attorney, Agent, or Firm* — Mori & Ward, LLP

(57) ABSTRACT

A calibrating method includes controlling a laser radiator to radiate calibration laser light to an object such that a pattern is projected in a laser coordinate system with respect to the laser radiator; controlling a camera to obtain a first image of first light points of the calibration laser light projected on a surface of the object when the object is in a first position; and controlling the camera to obtain a second image of second light points of the calibration laser light projected on the surface of the object when the object is in the second position. A positional relationship between the laser coordinate system and the camera coordinate system is calculated based on the three-dimensional positions of the first light points and the three-dimensional positions of the second light points.

18 Claims, 11 Drawing Sheets

(51) Int. Cl.
- *G01B 11/25* (2006.01)
- *G06T 7/521* (2017.01)
- *B23K 26/082* (2014.01)
- *G06T 7/80* (2017.01)
- *G06T 7/33* (2017.01)
- *B23K 26/08* (2014.01)
- *B23K 26/03* (2006.01)
- *B23K 26/70* (2014.01)
- *B23K 26/21* (2014.01)

(52) U.S. Cl.
CPC .......... *B23K 26/0884* (2013.01); *B23K 26/21* (2015.10); *B23K 26/707* (2015.10); *G01B 11/2518* (2013.01); *G02B 26/127* (2013.01); *G06T 7/33* (2017.01); *G06T 7/521* (2017.01); *G06T 7/80* (2017.01); *G06T 2207/30244* (2013.01)

(58) Field of Classification Search
CPC ........... H04N 13/246; G06T 7/33; G06T 7/80; G06T 7/521; G06T 2207/30244; G02B 26/127; G01B 11/2518
See application file for complete search history.

(56) References Cited

U.S. PATENT DOCUMENTS

2020/0124406 A1* 4/2020 Gorschenew ...... G01N 21/8806

OTHER PUBLICATIONS

Extended European Search Report for corresponding EP Application No. 18211900.8, dated Feb. 22, 2019.
Communication pursuant to Article 94(3) for corresponding EP Application No. 18211900.8, dated Feb. 10, 2020.
Chinese Office Action for corresponding CN Application No. 201811553798.7, dated Sep. 3, 2020.

* cited by examiner

CALIBRATING METHOD AND CALIBRATION APPARATUS

CROSS-REFERENCE TO RELATED APPLICATIONS

The present application claims priority under 35 U.S.C. § 119 to Japanese Patent Application No. 2017-244937, filed Dec. 21, 2017. The contents of this application are incorporated herein by reference in their entirety.

BACKGROUND

Field of the Invention

The present invention relates to a calibrating method and a calibration apparatus.

Discussion of the Background

JP 8-174256 A discloses a laser machining apparatus that includes a pair of rotation mirrors, a flat field lens, an XY stage, and a measuring device. The flat field lens collects laser light rays reflected by the pair of rotation mirrors onto to a predetermined plane. The measuring device measures positions of radiation traces of the laser light rays.

SUMMARY

According to one aspect of the present disclosure, a calibrating method includes controlling a laser radiator to radiate calibration laser light to an object such that a pattern is projected in a laser coordinate system with respect to the laser radiator; controlling a camera to obtain a first image of first light points of the calibration laser light projected on a surface of the object when the object is in a first position; calculating, based on the first image, three-dimensional positions of the first light points in a camera coordinate system with respect to the camera; changing a position of the object from the first position to a second position; controlling the camera to obtain a second image of second light points of the calibration laser light projected on the surface of the object when the object is in the second position; calculating, based on the second image, three-dimensional positions of the second light points in the camera coordinate system; and calculating a positional relationship between the laser coordinate system and the camera coordinate system based on the three-dimensional positions of the first light points and the three-dimensional positions of the second light points.

According to another aspect of the present disclosure, a calibration apparatus includes circuitry configured to control a laser radiator to radiate calibration laser light to an object such that a pattern is projected in a laser coordinate system with respect to the laser radiator; control a camera to obtain a first image of first light points of the calibration laser light projected on a surface of the object when the object is in a first position; calculate, based on the first image, three-dimensional positions of the first light points in a camera coordinate system with respect to the camera; change a position of the object from the first position to a second position; control the camera to obtain a second image of second light points of the calibration laser light projected on the surface of the object when the object is in the second position; calculate, based on the second image, three-dimensional positions of the second light points in the camera coordinate system; and calculate a positional relationship between the laser coordinate system and the camera coordinate system based on the three-dimensional positions of the first light points and the three-dimensional positions of the second light points.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
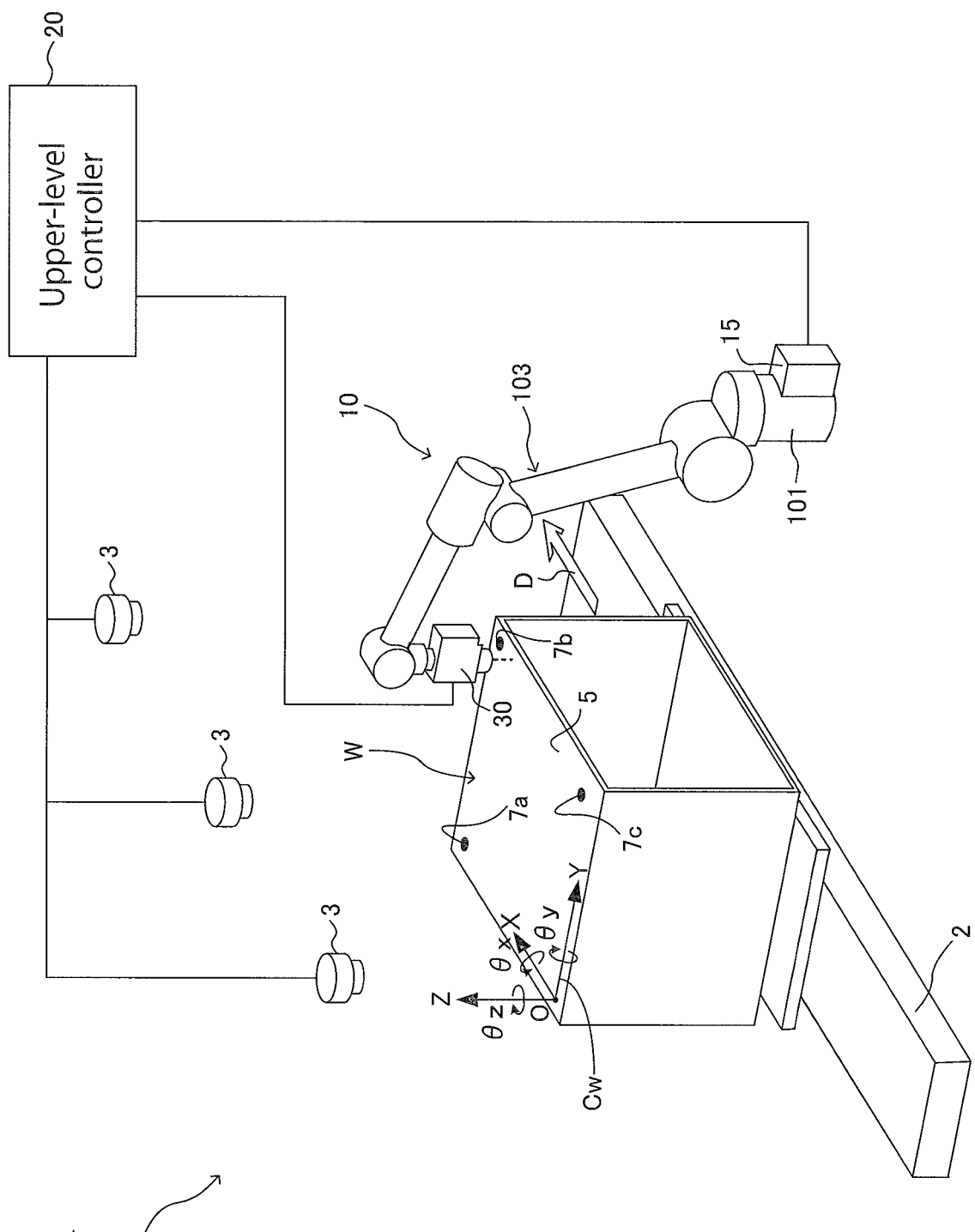
FIG. 1 illustrates an example general arrangement of a robot system according to an embodiment.

The embodiments will now be described with reference to the accompanying drawings, wherein like reference numerals specifies corresponding or identical elements throughout the various drawings.

1. General Arrangement of Robot System

By referring to FIG. 1, a general arrangement of a robot system 1 will be described. The robot system 1 is a robot system to which the calibrating method according to this embodiment for calibrating a laser coordinate system a camera coordinate system is applicable.

Figure 7:
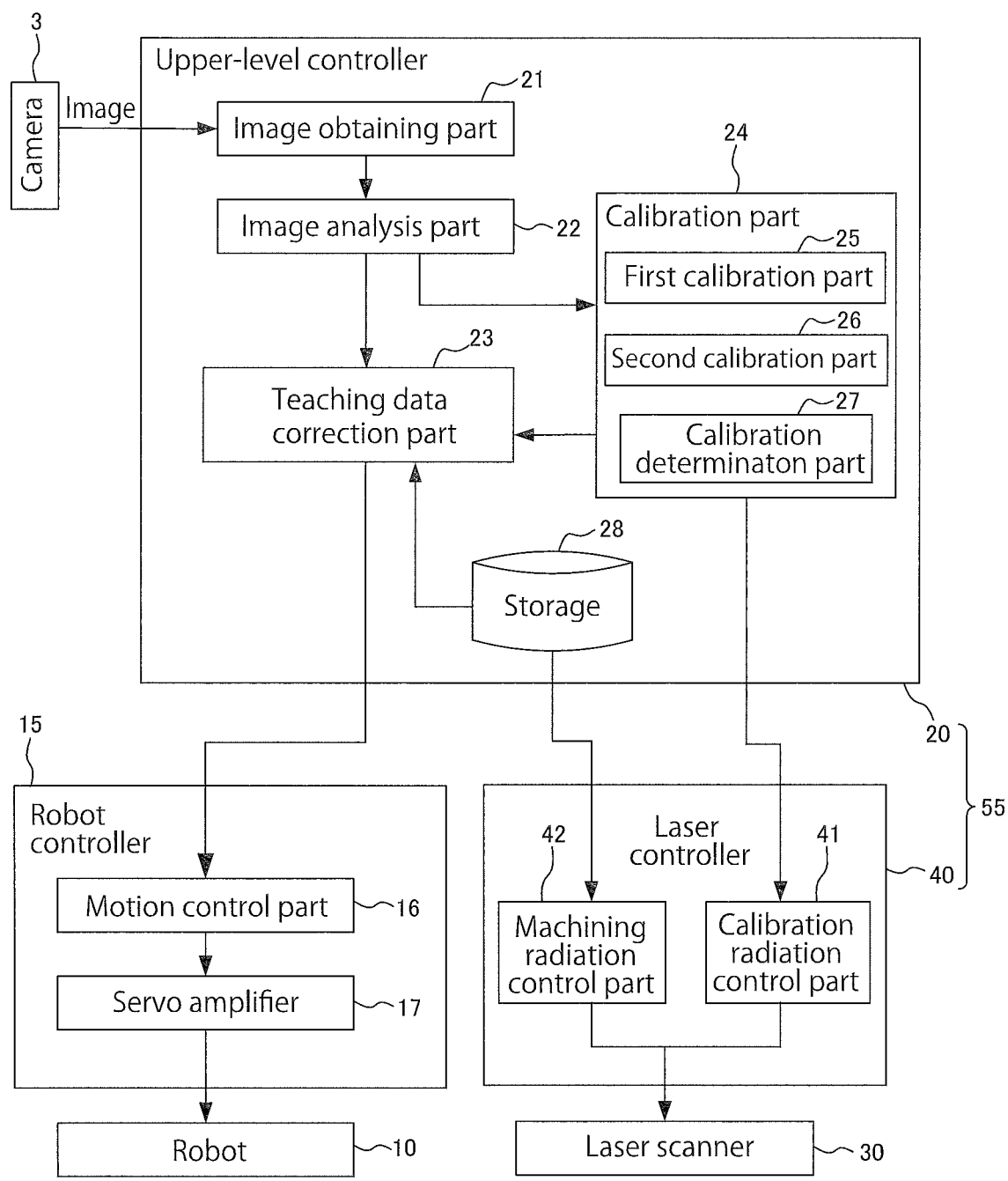
FIG. 7 is a block diagram illustrating an example functional configuration of an upper-level controller, an example functional configuration of a laser controller, and an example functional configuration of a robot controller.

As illustrated in FIG. 1, the robot system 1 is a system that works on a workpiece W using a robot 10 while the workpiece W is being conveyed by a conveyor 2. The robot system 1 includes the conveyor 2, cameras 3, the robot 10, a laser scanner 30, an upper-level controller 20, a laser controller 40, and a robot controller 15 (see FIG. 7, described later). The laser controller 40 is incorporated in the laser scanner 30 (see FIGS. 3 and 7, described later).

The conveyor 2 conveys the workpiece W along a predetermined movement path. It is to be noted that arrow D illustrated in FIG. 1 denotes the direction in which the conveyor 2 conveys the workpiece W. The conveyor 2 may stop the workpiece W at a work position of the robot 10 or may keep the workpiece W moving even at the work position. The workpiece W includes one part or a plurality of parts, among which is a top plate 5. On the top plate 5, the robot 10 performs predetermined work. While there is no particular limitation to the workpiece W, a non-limiting example is a body of a vehicle.

The robot 10 is located near the conveyor 2. A non-limiting example of the robot 10 is a vertical multi-articular six-axis robot, having six joints. At the leading end of the robot 10, the laser scanner 30 is mounted. the laser scanner 30 is an end effector. The robot controller 15 is mounted on a base 101 of the robot 10 and controls the robot 10. It is to be noted that the robot 10 may be other than a six-axis robot (examples including, but are not limited to, a five-axis robot and a seven-axis robot). Also, the robot 10 may be other than a vertical multi-articular robot, other examples including, but not limited to, a horizontal multi-articular robot and a parallel link robot. Also, the robot controller 15 may be located at a distant position from the robot 10.

The cameras 3 (in this embodiment, three cameras 3) are aligned in the conveyance direction over the conveyor 2. The cameras 3 detect a three-dimensional position of the workpiece W in a real-time manner at the time when the robot 10 performs the predetermined work. The cameras 3 are connected to the upper-level controller 20 so that images taken by the cameras 3 are transmitted to the upper-level controller 20.

It is to be noted that the number of cameras 3 will not be limited to three but may be one, two, four, or more than four. It is also to be noted that each of the cameras 3 may be a single camera (monocular camera) or may be made up of a plurality of cameras (that is, each camera 3 may be a stereo camera). It is also to be noted that the cameras may be replaced with any other sensors capable of detecting a three-dimensional position of the workpiece W (examples of such sensors include, but are not limited to, laser sensors).

On the top plate 5 of the workpiece W, a plurality of markers 7 are located. The plurality of markers 7 are used for position detecting purposes. In this embodiment, the markers 7 include three markers 7a to 7c. The marker 7a is located near one of the four corners of the top plate 5; the marker 7b is located near another one of the four corners of the top plate 5; and the marker 7c is located near still another one of the four corners of the top plate 5. The three markers 7a to 7c define a three-dimensional coordinate system (hereinafter occasionally referred to as "workpiece coordinate system") with a predetermined position on the workpiece W defined as origin O. In this embodiment, workpiece coordinate system Cw is defined with a position near one corner of the top plate 5 defined as the origin O. The workpiece coordinate system Cw has X axis, Y axis, and Z axis, which are orthogonal to each other. The workpieces W to be worked on by the robot 10 each have a teaching point set on the workpiece coordinate system Cw so that the teaching point serves as the target of the predetermined work.

Images of the three markers 7a to 7c are taken by the cameras 3. Then, the images are received by an image analysis part 22 (see FIG. 7, described later) of the upper-level controller 20. Upon receipt of the images, the image analysis part 22 measures a three-dimensional position and a three-dimensional posture of the workpiece W on camera coordinate system Cc (see FIGS. 4A and 4B, described later) of each of the cameras 3. The three-dimensional posture includes rotational angle $\theta x$ about the X axis, rotational angle $\theta y$ about the Y axis, and rotational angle $\theta z$ about the Z axis. The coordinates of the teaching point on the workpiece coordinate system Cw are converted into coordinates (teaching data) on robot coordinate system Cr (not illustrated) of the robot 10, and the teaching data of the robot coordinate system Cr is stored in a storage 28 (see FIG. 7, described later). The stored teaching data is corrected as necessary by a teaching data correction part 23 (see FIG. 7, described later) based on the measured three-dimensional position and the measured three-dimensional posture of the workpiece W on the camera coordinate system Cc.

As detailed later, a calibration part 24 (see FIG. 7, described later) of the upper-level controller 20 calibrates in advance the camera coordinate system Cc relative to scanner coordinate system Cs (see FIGS. 4A and 4B, described later) of the laser scanner 30, or calibrates in advance the scanner coordinate system Cs relative to the camera coordinate system Cc. Also, there is a positional relationship between the scanner coordinate system Cs and the robot coordinate system Cr. The positional relationship is obtainable from the posture of the robot 10 and/or other parameters. Based on the result of the calibration and the obtained positional relationship, the teaching data correction part 23 corrects the teaching data of the robot coordinate system Cr based on the measured three-dimensional position and the measured three-dimensional posture of the workpiece W. The corrected teaching data is transmitted to the robot controller 15 so that the robot 10 performs laser welding on the workpiece W based on the corrected teaching data.

It is to be noted that the number of markers 7 located on the workpiece W may be other than the above-described number, and the positions of the markers 7 may be other than the above-described positions. It is also to be noted that the detection targets of the cameras 3 will not be limited to markers; for example, depressions, protrusions, holes, and/or any other shapes on the workpiece W are possible insofar as these shapes serve as references for position detecting purposes.

The laser scanner 30 (which is a non-limiting example of the laser radiator recited in the appended claims) switchably radiates calibration laser light and machining laser light coaxial to the calibration laser light. In the case of laser welding on the workpiece W, the laser scanner 30 radiates machining laser light. In the case of a calibration the scanner coordinate system Cs and the camera coordinate system Cc relative to each other, the laser scanner 30 radiates calibration laser light.

2. Configuration of Robot

An example configuration of the robot 10 will be described by referring to FIG. 2.

Figure 2:
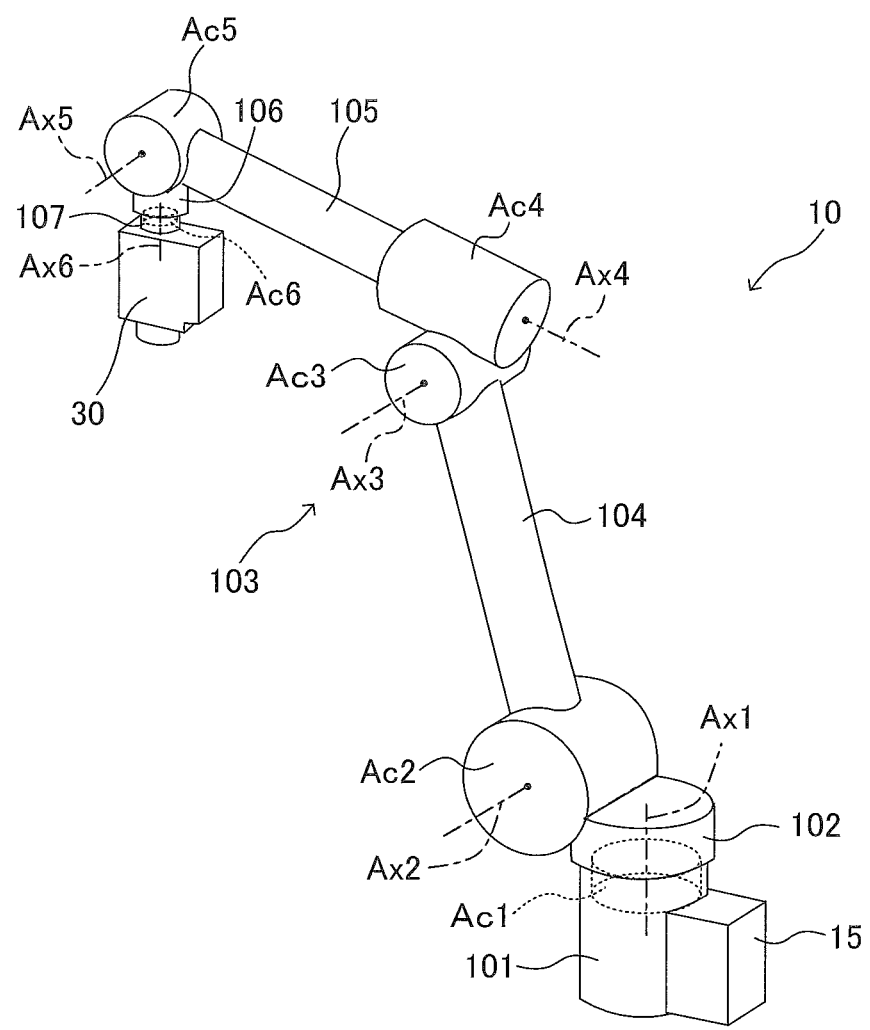
FIG. 2 illustrates an example configuration of a robot.

As illustrated in FIG. 2, the robot 10 includes the base 101, a turnable part 102, and an arm 103. The base 101 is fixed, with anchor bolts, to the installation surface on which the robot 10 is installed. A non-limiting example of the installation surface is a floor surface. Other examples of the installation surface include a ceiling surface and a side surface.

The turnable part 102 is supported by the leading end of the base 101 that is opposite to the installation surface of the base 101. The turnable part 102 is turnable about rotation axis Ax1, which is approximately perpendicular to the installation surface. The turnable part 102 is driven by an actuator Ac1, which is located at the joint between the turnable part 102 and the base 101, to turn about the rotation axis Ax1 relative to the leading end of the base 101.

The arm 103 is supported by one side portion of the turnable part 102. The arm 103 includes a lower arm 104, an upper arm 105, a wrist 106, and a flange 107.

The lower arm 104 is supported by the one side portion of the turnable part 102 and is turnable about rotation axis Ax2, which is approximately perpendicular to the rotation axis Ax1. The lower arm 104 is driven by an actuator Ac2, which is located at the joint between the lower arm 104 and the turnable part 102, to turn about the rotation axis Ax2 relative to the one side portion of the turnable part 102.

The upper arm 105 is supported by the leading end of the lower arm 104 and turnable about rotation axis Ax3, which is approximately parallel to the rotation axis Ax2. The upper arm 105 is also rotationally movable about rotation axis Ax4, which is approximately perpendicular to the rotation axis Ax3. The upper arm 105 is driven by an actuator Ac3, which is located at the joint between the upper arm 105 and the lower arm 104, to turn about the rotation axis Ax3 relative to the leading end of the lower arm 104. The upper arm 105 is also driven by an actuator Ac4, which is located between the upper aim 105 and the actuator Ac3, to rotationally move about the rotation axis Ax4 relative to the leading end of the lower arm 104.

The wrist 106 is supported by the leading end of the upper arm 105 and is turnable about rotation axis Ax5, which is approximately perpendicular to the rotation axis Ax4. The wrist 106 is driven by an actuator Ac5, which is located at the joint between the wrist 106 and the upper arm 105, to turn about the rotation axis Ax5 relative to the leading end of the upper arm 105.

The flange 107 is supported by the leading end of the wrist 106 and rotationally movable about rotation axis Ax6, which is approximately perpendicular to the rotation axis Ax5. The flange 107 is driven by an actuator Ac6, which is located at the joint between the flange 107 and the wrist 106, to rotationally move about the rotation axis Ax6 relative to the leading end of the wrist 106.

The laser scanner 30 is mounted on the leading end of the flange 107 and rotationally movable about the rotation axis Ax6 along with the rotationally movement of the flange 107 about the rotation axis Ax6.

With the above-described configuration, the robot 10 is a six-axis robot, having six joints, with the six actuators Ac1 to Ac6 at the joints. The actuators Ac1 to Ac6, which drive the respective joints, each include a servo motor, a reducer, and a brake. It is to be noted that the servo motor, the reducer, and the brake may not necessarily be arranged on the rotation axis centers Ax1 to Ax6 but may be disposed at a distance from the rotation axis centers Ax1 to Ax6.

It is to be noted that in the above description, the rotation about a rotation axis center extending in the longitudinal direction (or extending direction) of the arm 103 is referred to as "rotational movement", whereas the rotation about a rotation axis center extending approximately perpendicularly to the longitudinal direction of the arm 103 is referred to as "turning".

3. Conceptual Configuration of Laser Scanner

By referring to FIG. 3, an example conceptual configuration of the laser scanner 30 will be described.

Figure 3:
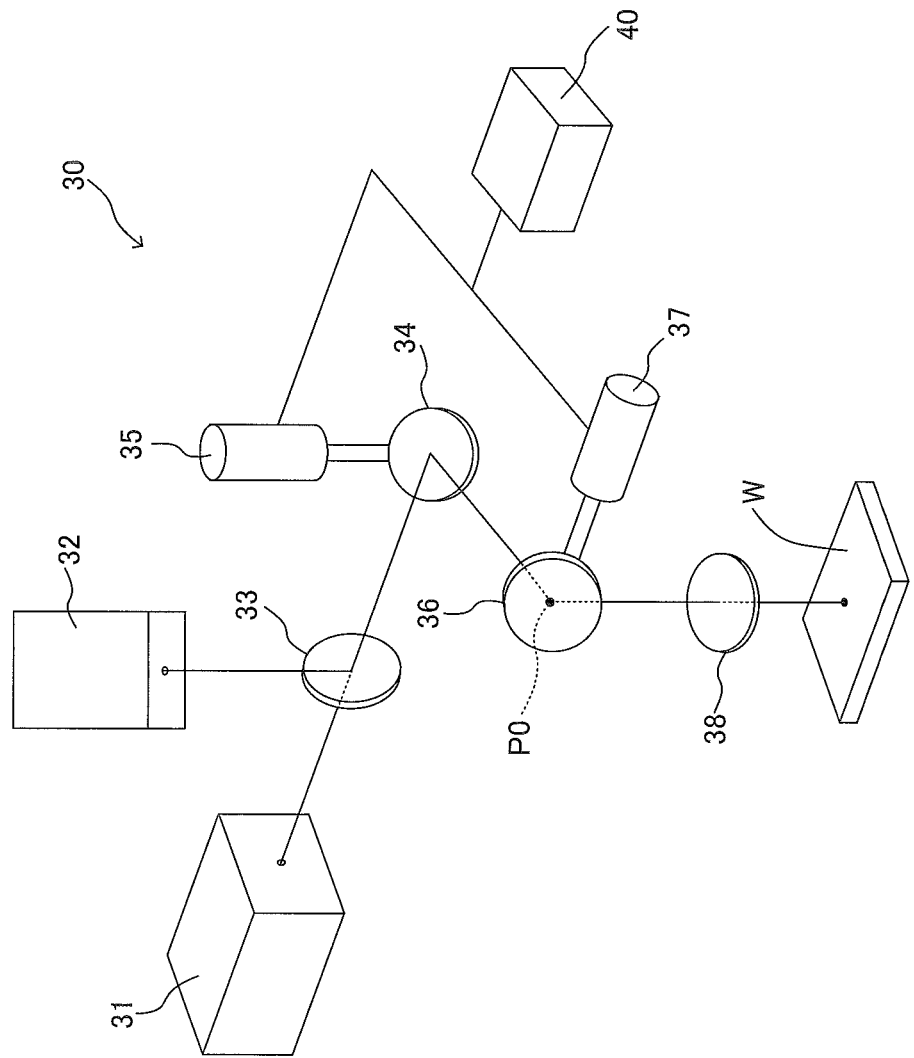
FIG. 3 illustrates an example conceptual configuration of a laser scanner.

As illustrated in FIG. 3, the laser scanner 30 includes a machining laser oscillator 31, a calibration laser oscillator 32, a switch mirror 33, an X axis mirror 34, an X axis motor 35, a Y axis mirror 36, a Y axis motor 37, a light concentration lens 38, and the laser controller 40.

The machining laser oscillator 31 emits machining laser light used for machining such as welding of the workpiece W The machining laser light emitted from the machining laser oscillator 31 passes through the switch mirror 33 and is reflected by the X axis mirror 34 and the Y axis mirror 36. Then, the reflected machining laser light is concentrated by the light concentration lens 38 and is radiated to a welded portion of the workpiece W. The laser controller 40 drives the X axis motor 35 and the Y axis motor 37 to control the angles of the X axis mirror 34 and the Y axis mirror 36 so as to cause the machining laser light to scan the workpiece W in the X axis direction and the Y axis direction based on welding data.

The calibration laser oscillator 32 emits calibration laser light used to calibrate the coordinate system of the laser scanner 30 and the coordinate system of each camera 3 relative to each other. A non-limiting example of the calibration laser light is visible spectrum light. The calibration laser light emitted from the calibration laser oscillator 32 is switched by the switch mirror 33 to replace the machining laser light such that the calibration laser light and the machining laser light have a common optical axis. Similarly to the machining laser light, the calibration laser light is reflected by the X axis mirror 34 and the Y axis mirror 36 and concentrated by the light concentration lens 38 to be radiated to a calibration plate 50 (see FIGS. 4 and 5, described later). How to calibrate the coordinate systems will be described later. As illustrated in FIG. 3, control origin P0 is a reflection point that defines the direction of the laser light emitted from the laser scanner 30 and that serves as the center point of the scanning of the workpiece W using the laser scanner 30.

It is the laser controller 40 that controls the machining laser oscillator 31 and the calibration laser oscillator 32 to emit and stop laser light and that controls the motor to drive the switch mirror 33 (this motor is not illustrated).

4. Calibrating Method for Calibrating Scanner Coordinate System and Camera Coordinate System By referring to FIGS. 4A, 4B, 5, and 6, description will be made with regard to an example calibrating method for calibrating the scanner coordinate system Cs of the laser scanner 30 and the camera coordinate system Cc of the camera 3.

The laser scanner 30 performs welding on the workpiece W based on position information that is regarding the position of the workpiece W and that has been obtained from images taken by the cameras 3. This requires the camera coordinate system Cc and the scanner coordinate system Cs to be a calibrated by calculating a positional relationship between the camera coordinate system Cc and the scanner coordinate system Cs. In this embodiment, the camera coordinate system Cc and the scanner coordinate system Cs are calibrated relative to each other in the following manner.

Figure 4A:
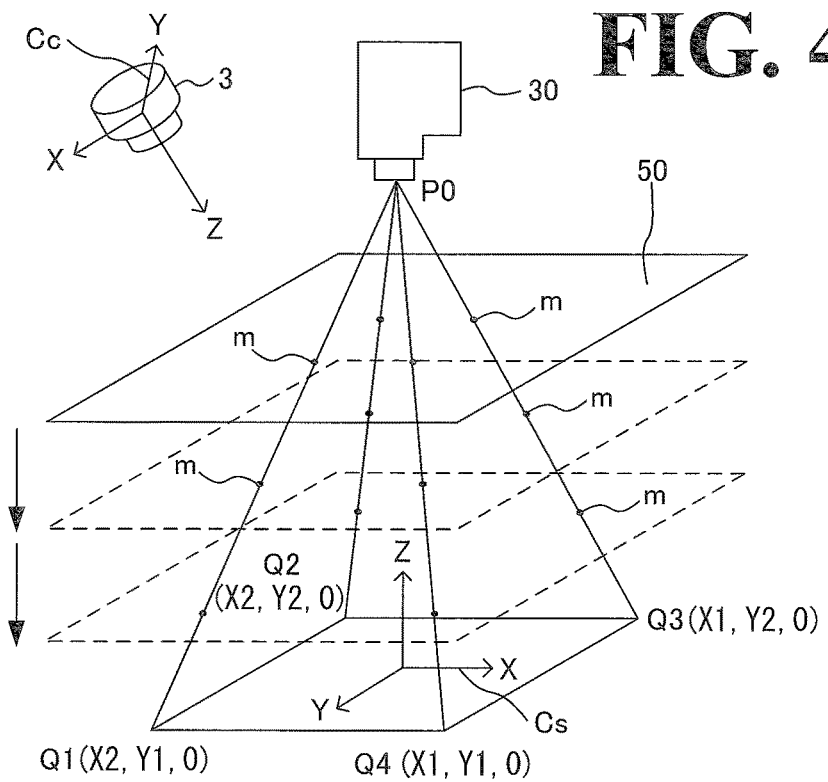
FIG. 4A illustrates an example method of obtaining three-dimensional point groups constituting a quadrangular pyramid that connects a control origin to a rectangular pattern of Z=0 in a scanner coordinate system.

In the scanner coordinate system Cs of the laser scanner 30, the laser scanner 30 radiates calibration laser light having a predetermined pattern illustrated in FIG. 4A. The predetermined pattern is a rectangular pattern having apexes at point Q1 (X2, Y1, 0), point Q2 (X2, Y2, 0), point Q3 (X1, Y2, 0), and point Q4 (X1, Y1, 0) on an X-Y plane of Z=0. Thus, the laser scanner 30 forms a quadrangular pyramid of laser light connecting the control origin P0 to the points Q1, Q2, Q3, and Q4.

It is to be noted that the "scanner coordinate system Cs" is an orthogonal coordinate system that is made up of mutually orthogonal X, Y, and Z axes and that has been optically designed to specify the position to which the laser scanner 30 radiates laser light. It is also to be noted that the predetermined pattern may be formed on a surface at which Z is other than zero insofar as the surface is perpendicular to the Z axis. It is also to be noted that the predetermined pattern may have other than a rectangular shape, other examples including, but not limited to: a graphical shape such as a triangle and a circle; a letter; and a symbol. That is, the predetermined pattern may be any pattern that enables the workpiece W to be scanned over predetermined distances in the X axis direction and the Y axis direction in the scanner coordinate system Cs, with the control origin P0 serving as scanning center.

The predetermined pattern of laser light is projected onto a surface of the plate 50 (which is a non-limiting example of the object recited in the appended claims). The plate 50 is located at a position where the laser light can be projected onto the surface of the plate 50. On the surface of the plate 50, four light points m of the laser light are projected and taken by the camera 3. Then, with the light points m projected on the surface of the plate 50, the position of the plate 50 is changed. Specifically, the position of the plate 50 may be changed in the manner illustrated in FIG. 4A; with the posture of the plate 50 kept unchanged, the height position of the plate 50 (position in the Z axis direction) is changed. Alternatively, the position of the plate 50 may be changed in the manner illustrated in FIG. 4B; the posture of the plate 50 is changed by swinging the plate 50. Alternatively, these manners may be combined with each other. That is, the position of the plate 50 may be changed so as to change the height positions (Z axis positions) of the light points m. It is to be noted that the position of the plate 50 may be changed manually by a worker or automatically by any suitable device.

Figure 4B:
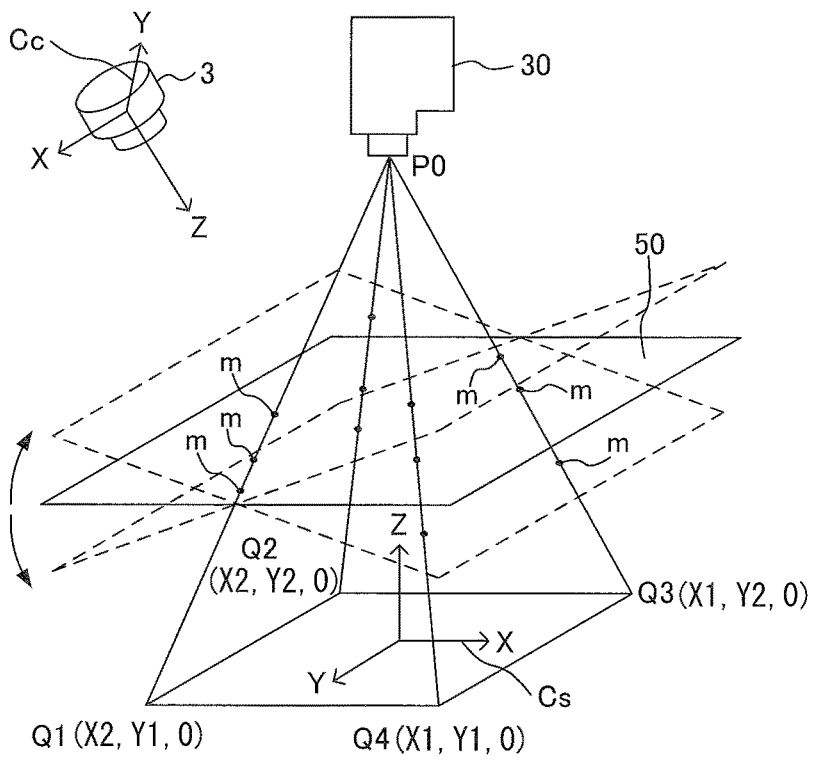
FIG. 4B illustrates another example method of obtaining three-dimensional point groups constituting the quadrangular pyramid that connects the control origin to the rectangular pattern of Z=0 in the scanner coordinate system.

While the position of the plate 50 is being changed in any of the above-described manners, the camera 3 takes an image of each of the four light points mat each changed position of the plate 50. It is to be noted that the camera 3 may take images continuously in terms of time or intermittently in terms of time, that is, take an image every time the position of the plate 50 is changed. The position of the plate 50 may be changed at least once, that is, an image of the light point m on each side of the quadrangular pyramid may be taken at least two positions. It is also possible to take an image of each light point mat three or more positions that are preferably as far away as possible from each other. In the examples of FIGS. 4A and 4B, the position of the plate 50 is changed twice, that is, an image of the light point m on each side of the quadrangular pyramid is taken at three positions. The images of each light point m taken by the camera are transmitted to the upper-level controller 20, where the images are analyzed to measure a three-dimensional position of each light point m in the camera coordinate system Cc of the camera 3. In this manner, a plurality of three-dimensional point groups constituting the quadrangular pyramid are obtained. It is to be noted that the "camera coordinate system Cc" is an orthogonal coordinate system that is made up of mutually orthogonal X, Y, and Z axes and that has been optically designed to measure three-dimensional positions of the light points m based on images taken by the camera 3.

Figure 5:
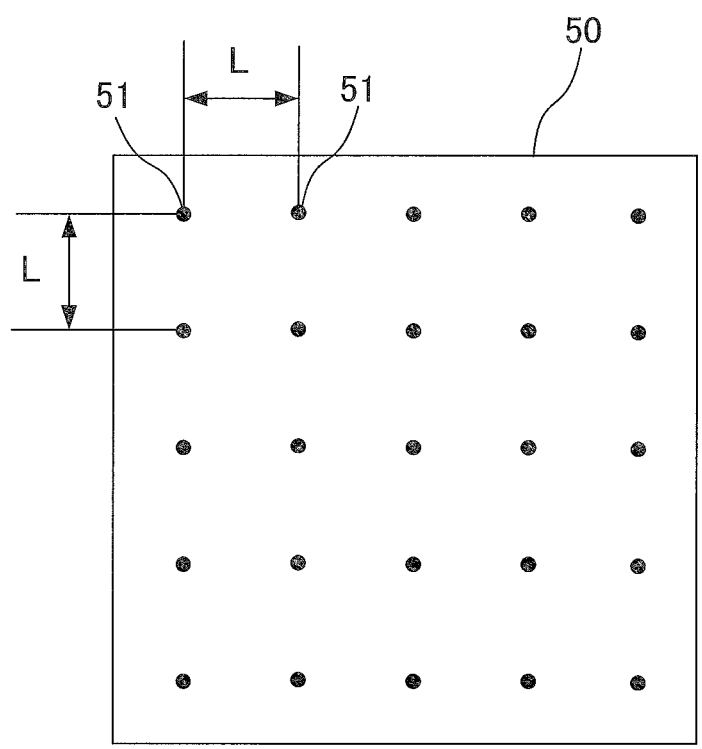
FIG. 5 is a plan view of an example plate with markers.

As illustrated in FIG. 5, the plate 50 is a plate with markers arranged in a predetermined pattern on the plate 50. Specifically, a plurality of markers 51 are arranged in a matrix pattern on the plate 50 such that the markers 51 are arranged at predetermined uniform intervals L vertically and horizontally. Using this plate with markers ensures that a three-dimensional position of each light point m is measured using the monocular camera 3 by "perspective distortion matching processing". It is to be noted that when the camera 3 is a stereo camera, it is possible to use a plate without markers.

Figure 6:
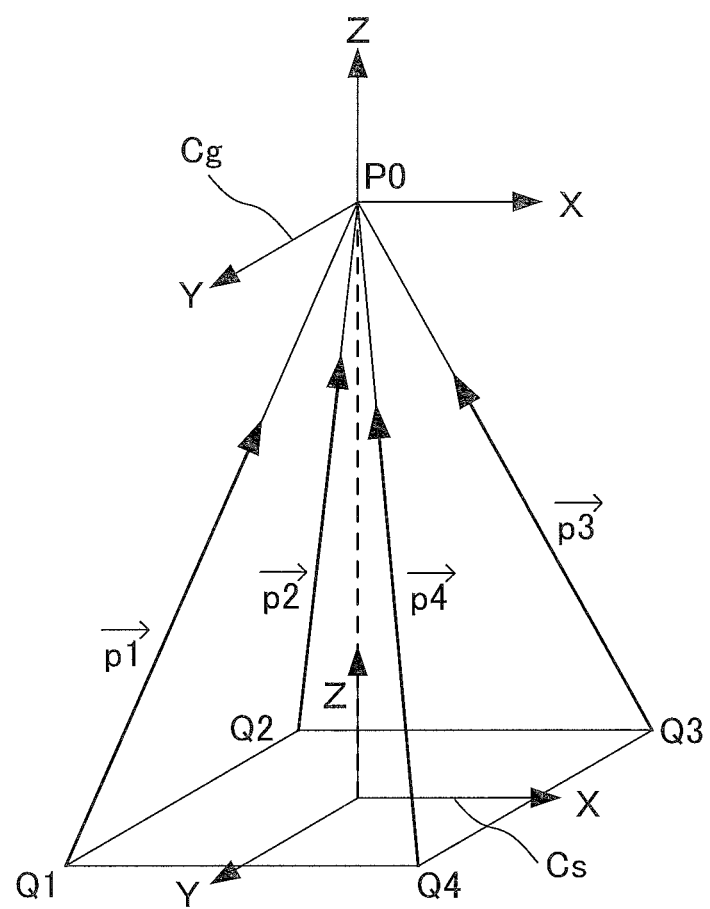
FIG. 6 illustrates an example method of calculating a galvanic coordinate system and a scanner coordinate system.

Next, the upper-level controller 20 calculates regression lines based on the three-dimensional positions of the light points m obtained by the camera 3. Based on the regression lines, the upper-level controller 20 calculates vectors constituting the quadrangular pyramid as illustrated in FIG. 6. Specifically, the vectors include vector p1 (the vector directed from the point Q1 toward the control origin P0), vector p2 (the vector directed from the point Q2 toward the control origin P0), vector p3 (the vector directed from the point Q3 toward the control origin P0), and vector p4 (the vector directed from the point Q4 toward the control origin P0). Then, the upper-level controller 20 calculates the laser-light control origin P0 based on the intersection of the vectors p1, p2, p3, and p4 that have been calculated. Also based on the vectors p1, p2, p3, and p4, the upper-level controller 20 calculates base vectors (X axis vector, Y axis vector, and Z axis vector) of galvanic coordinate system Cg with its origin set at the control origin P0. Specifically, the upper-level controller 20 calculates the Z-axis base vector by adding (or averaging) the vectors p1, p2, p3, and p4; calculates the X-axis base vector by calculating a difference between the vectors p1 and p4 (or between the vectors p2 and p3); and calculates the Y-axis base vector by calculating a difference between the vectors p1 and p2 (or between the vectors p3 and p4). In this manner, a galvanic coordinate system as seen from the camera coordinate system Cc is calculated.

It is to be noted that the "galvanic coordinate system Cg" is an orthogonal coordinate system that is made up of: X, Y, and Z axes, which are orthogonal to each other; and the control origin P0, which serves as the origin of the galvanic coordinate system Cg. A positional relationship between the galvanic coordinate system Cg and the scanner coordinate system Cs is that the corresponding base vectors of the systems are the same with the origins of the systems located away from each other in the Z axis direction by an optically designed amount of distance. The galvanic coordinate system Cg and the scanner coordinate system Cs are non-limiting example of the laser coordinate system recited in the appended claims.

Thus, by calculating the galvanic coordinate system, scanner coordinates as seen from the camera coordinate system Cc are calculated, ensuring that a calibration between the camera coordinate system Cc and the scanner coordinate system Cs is implemented. It is to be noted that when the position to which the laser scanner 30 radiates laser light is specified by the galvanic coordinate system Cg instead of by the scanner coordinate system Cs, it is possible to make a calibration between the camera coordinate system Cc and the galvanic coordinate system Cg.

5. Functional Configurations of Upper-level Controller, Laser Controller, and Robot Controller By referring to FIG. 7, example functional configurations of the upper-level controller 20, the laser controller 40, and the robot controller 15 will be described. The upper-level controller 20 and the laser controller 40 constitute a calibration apparatus 55.

Examples of the upper-level controller 20 include, but are not limited to, a personal computer (PC) and a programmable logic controller (PLC). The upper-level controller 20 includes an image obtaining part 21, the image analysis part 22, the teaching data correction part 23, the calibration part 24, and the storage 28.

The image obtaining part 21 obtains images taken by the cameras 3. The images include: images, taken at the changed positions, of the light points m projected on the surface of the plate 50; and images of the markers 7a to 7c of the workpiece W.

The image analysis part 22 performs predetermined image analysis processing on the images obtained by the image obtaining part 21 to measure three-dimensional positions of the light points m in the camera coordinate system Cc and measure three-dimensional positions of the markers 7a to 7c.

The calibration part 24 includes a first calibration part 25, a second calibration part 26, and a calibration determination part 27.

After the three-dimensional positions of the plurality of light points m in the camera coordinate system Cc have been obtained based on the images taken by the cameras 3, the first calibration part 25 calculates a positional relationship between the scanner coordinate system Cs and the camera coordinate system Cc based on the three-dimensional positions of the plurality of light points m. Specifically, the first calibration part 25 calculates regression lines based on the three-dimensional positions of the plurality of light points m. Based on the regression lines, the first calibration part 25 calculates the vectors p1, p2, p3, and p4, which constitute the quadrangular pyramid. Then, based on the intersection of the vectors p1, p2, p3, and p4, the first calibration part 25 calculates the laser-light control origin P0. Then, the first calibration part 25 calculates, based on the vectors p1, p2, p3, and p4, the base vectors of the galvanic coordinate system Cg with the origin of the galvanic coordinate system Cg set at the control origin P0. Then, the first calibration part 25 calculates a positional relationship between the camera coordinate system Cc and the scanner coordinate system Cs based on a predetermined amount of distance that has been optically designed.

After the first calibration part 25 has calculated the positional relationship between the scanner coordinate system Cs and the camera coordinate system Cc, the calibration determination part 27 specifies a predetermined radiation position in the camera coordinate system Cc and causes laser light to be radiated to the predetermined radiation position on the plate 50 located at a predetermined reference position. In this manner, the calibration determination part 27 determines (based on the three-dimensional positions of the light points m that have been obtained based on the images taken by the cameras 3) whether the scanner coordinate system Cs and the camera coordinate system Cc have been calibrated relative to each other normally. For example, when there is a position error between the specified radiation position and the positions of the light points m that is equal to or less than a predetermined threshold, the calibration determination part 27 determines that the scanner coordinate system Cs and the camera coordinate system Cc have been calibrated relative to each other normally. When the position error is greater than the predetermined threshold, the calibration determination part 27 determines that an abnormality has occurred. When the calibration determination part 27 has determined that the scanner coordinate system Cs and the camera coordinate system Cc have been calibrated relative to each other normally, the result of the calibration of the scanner coordinate system Cs and the camera coordinate system Cc relative to each other is stored for use in processing performed by the teaching data correction part 23. When the calibration determination part 27 has determined that the scanner coordinate system Cs and the camera coordinate system Cc have been calibrated relative to each other abnormally (that is, determined that an abnormality has occurred), the first calibration part 25 performs the calibration again.

When the calibration determination part 27 has determined that the scanner coordinate system Cs and the camera coordinate system Cc have been calibrated relative to each other normally, the second calibration part 26 performs an inter-camera calibration between the calibrated camera coordinate system Cc of the camera 3 and the camera coordinate system Cc of another camera 3 whose field of vision overlaps the field of vision of the calibrated camera 3. This will be described later by referring to FIGS. 9 and 10.

The storage 28 stores data such as: teaching data for the robot 10 to perform welding work on the workpiece W; and welding data for the laser scanner 30 to perform welding on the workpiece W (a non-limiting example of the welding data is information concerning weld position, welding speed, and/or welding track). As described above, coordinates of the teaching point, which is the welding target, are specified in the workpiece coordinate system Cw of the workpiece W, and the teaching point is converted into a teaching point corresponding to the robot coordinate system Cr of the robot 10. Then, the converted teaching point is stored in the storage 28 as teaching data. It is to be noted that the conversion of the teaching point of the workpiece coordinate system Cw to the teaching point of the robot coordinate system Cr is performed under the assumption that the workpiece W is in stationary state at a predetermined reference position and in a predetermined reference posture.

The teaching data correction part 23 reads the teaching data from the storage 28, and corrects the teaching data based on the result of the image analysis performed by the image analysis part 22 and based on the result of the calibration performed by the first calibration part 25. More specifically, the teaching data correction part 23 uses the positional relationship between the scanner coordinate system Cs and the robot coordinate system Cr, which is obtainable from the posture of the robot 10 and/or other parameters, as described above. Based on the result of the calibration and the obtained positional relationship, the teaching data correction part 23 corrects the teaching data read from the storage 28 based on the measured three-dimensional position and the measured three-dimensional posture of the workpiece W. The corrected teaching data is transmitted to the robot controller 15.

The robot controller 15 includes a motion controller 16 and a servo amplifier 17. The motion controller 16 receives the teaching data from the teaching data correction part 23. Based on the teaching data, the motion controller 16 calculates target rotational angles and/or other parameters of the servo motors (not illustrated) of the actuators Ac1 to Ac6 of the robot 10. The target rotational angles and/or other parameters correspond to a position of the laser scanner 30 at the distal end of the robot 10 specified in the teaching data. Then, the motion controller 16 outputs a motor position command corresponding to the target rotational angles and/or other parameters.

The servo amplifier 17 receives the motor position command from the motion controller 16. Based on the motor position command, the servo amplifier 17 controls driving power supplied to the servo motors of the actuators Ac1 to Ac6, thereby controlling motions of the robot 10.

The laser controller 40 includes a calibration radiation controller 41 and a machining radiation controller 42.

For the first calibration part 25 to calibrate the scanner coordinate system Cs and the camera coordinate system Cc relative to each other, the calibration radiation controller 41 controls the laser scanner 30 to radiate calibration laser light to the plate 50 such that the calibration laser light has a predetermined pattern in the scanner coordinate system Cs. Also, for the calibration determination part 27 to determine whether the coordinate system calibration has been performed normally, the calibration radiation controller 41 controls the laser scanner 30 to radiate calibration laser light to a predetermined radiation position in the camera coordinate system Cc.

The machining radiation controller 42, based on the welding data stored in the storage 28, controls the laser scanner 30 to radiate machining laser light to a predetermined position on the workpiece W.

It is to be noted that the processings performed by the processing parts of the upper-level controller 20, the processings performed by the processing parts of the laser controller 40, and the processings performed by the processing parts of the robot controller 15 may be performed by a smaller number of processing parts (for example, a single processing part) or by a larger number of processing parts. It is also to be noted that the processings performed by the upper-level controller 20, the processings performed by the laser controller 40, and the processings performed by the robot controller 15 may be assigned to other controllers. For example, the processings performed by the calibration part 24 may be performed by the laser controller 40; and the processings performed by the teaching data correction part 23 may be performed by the robot controller 15. It is also to be noted that the processing parts of the controllers 20, 40, and 15 may be implemented by a program executed by CPU 901 (described later by referring to FIG. 11). Alternatively, the processing parts of the controllers 20, 40, and 15 may be partially or entirely implemented by a tangible device or devices such as an application specific integrated circuit (ASIC), a field-programmable gate array (FPGA), and other electric circuits.

6. Details of Control Performed at Coordinate System Calibration

Figure 8:
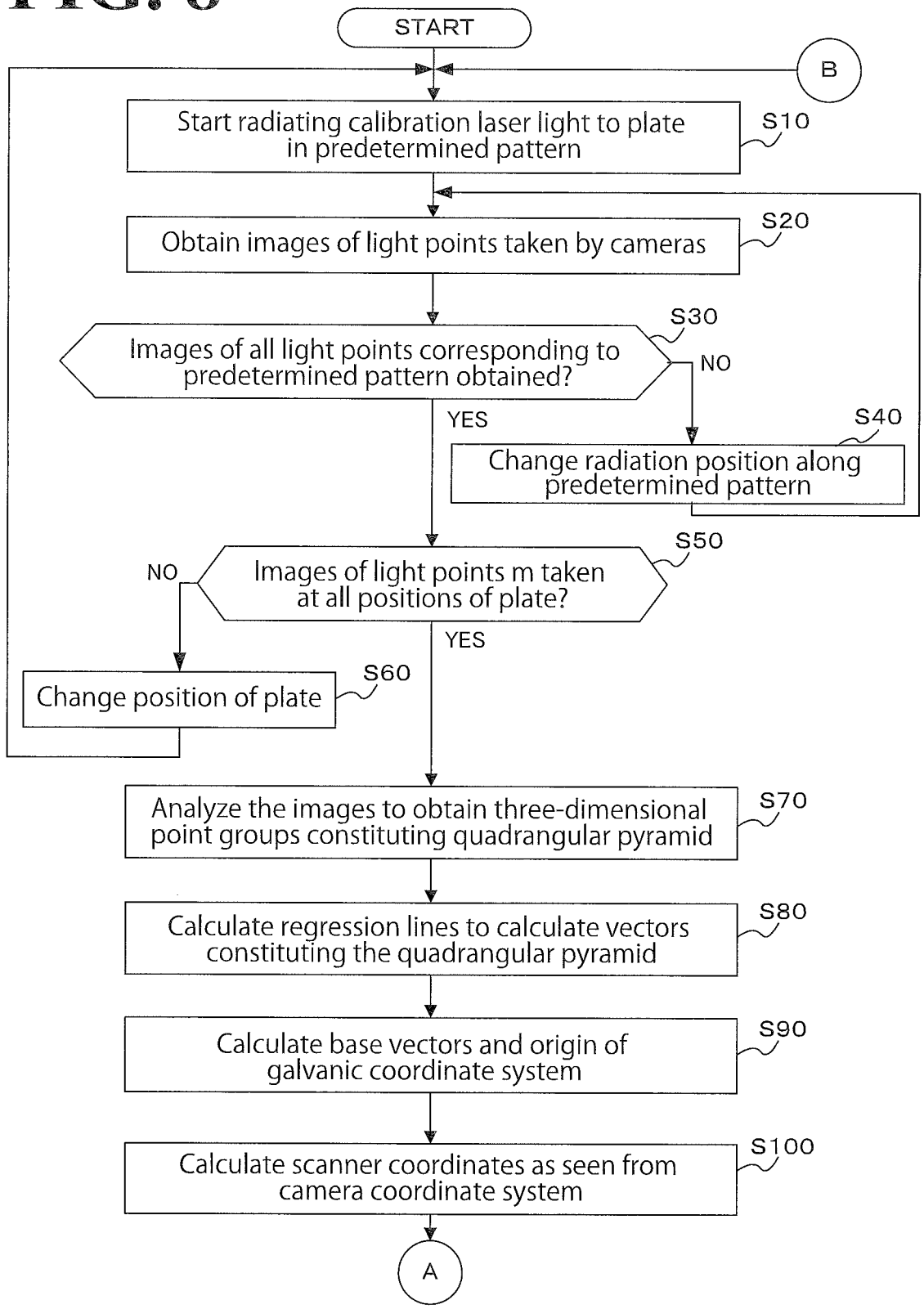
FIG. 8 is a flowchart of example control performed by the upper-level controller and the laser controller at the time of coordinate system calibration.
Figure 9:
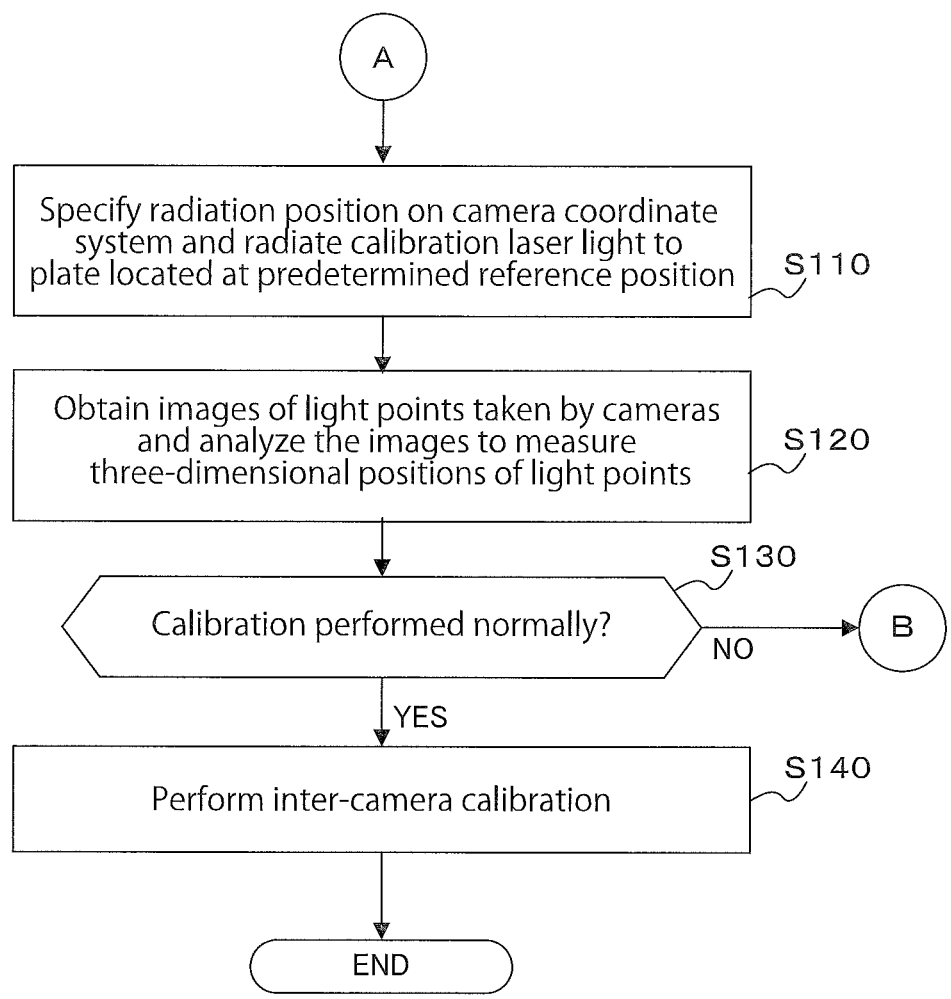
FIG. 9 is a flowchart of the example control performed by the upper-level controller and the laser controller at the time of coordinate system calibration.

By referring to FIGS. 8 and 9, description will be made with regard to example control performed by the upper-level controller 20 and the laser controller 40 at the time of coordinate system calibration.

At step S10, the calibration radiation controller 41 of the laser controller 40 controls the laser scanner 30 to start radiating calibration laser light, in a predetermined pattern in the scanner coordinate system Cs, to the plate 50 that may be located at any position. For example, the calibration radiation controller 41 specifies the point Q1 in the above-described rectangular pattern as the radiation position, and controls the laser scanner 30 to start radiating the calibration laser to the point Q1.

At step S20, the image obtaining part 21 of the upper-level controller 20 obtains, from the cameras 3, images of the light points m that are found on the surface of the plate 50.

At step S30, the image obtaining part 21 of the upper-level controller 20 determines whether images of all the light points m corresponding to the predetermined pattern have been obtained. For example, the image obtaining part 21 determines whether images of all the four light points m corresponding to the rectangular pattern have been obtained. When not all images of the light points m have been obtained (step S30: NO), the procedure proceeds to step S40.

At step S40, the calibration radiation controller 41 of the laser controller 40 controls the laser scanner 30 to change the radiation position along the predetermined pattern. For example, when the current radiation position is the point Q1, the calibration radiation controller 41 controls the laser scanner 30 to change the radiation position to the point Q2. When the current radiation position is the point Q2, the calibration radiation controller 41 controls the laser scanner 30 to change the radiation position to the point Q3. When the current radiation position is the point Q3, the calibration radiation controller 41 controls the laser scanner 30 to change the radiation position to the point Q4. Then, the procedure returns to step S20, and the processings at and after step S20 are performed again.

At step S30, when images of all the light points m have been obtained (step S30: YES), the procedure proceeds to step S50.

At step S50, a determination is made as to whether images of the light points m have been taken at all the positions of the plate 50. When images of the light points m have not been taken at all the positions of the plate 50 (step S50: NO), the procedure proceeds to step S60.

At step S60, the position of the plate 50 (the position and/or posture in height direction) is changed. The position of the plate 50 may be changed manually by a worker or automatically by any suitable device under the control of the upper-level controller 20 or another controller. Then, the procedure returns to step S10, and the processings at and after step S10 are performed again.

At step S50, when images of the light points m have been taken at all the changed positions of the plate 50 (step S50: YES), the procedure proceeds to step S70.

At step S70, now that the image obtaining part 21 has obtained the images of the light points m taken at the changed positions of the light points m, the image analysis part 22 of the upper-level controller 20 analyzes (performs image analysis processing on) the images to obtain three-dimensional positions (three-dimensional point groups) of the light points m, which constitute the quadrangular pyramid.

At step S80, the first calibration part 25 of the upper-level controller 20 calculates regression lines based on the three-dimensional positions of the light points m. Based on the regression lines, the first calibration part 25 calculates the vectors p1, p2, p3, and p4, which constitute the quadrangular pyramid.

At step S90, the first calibration part 25 calculates, based on the vectors p1, p2, p3, and p4, the base vectors and the origin (the control origin P0) of the galvanic coordinate system Cg.

At step S100, the first calibration part 25 calculates, based on the galvanic coordinate system Cg, scanner coordinates as seen from the camera coordinate system Cc. Thus, the calibration between the camera coordinate system Cc and the scanner coordinate system Cs is completed. After completion of step S100, the procedure proceeds to step S110 illustrated in FIG. 9.

At step S110, the calibration determination part 27 of the upper-level controller 20 and the calibration radiation controller 41 of the laser controller 40 control the laser scanner 30 to specify a radiation position on the camera coordinate system Cc and to radiate calibration laser light to the plate 50 located at a predetermined reference position.

At step S120, the image obtaining part 21 obtains, from the cameras 3, images of the light points m that are found on the surface of the plate 50. Then, the image analysis part 22 analyzes the images to measure three-dimensional positions of the light points m.

At step S130, the calibration determination part 27 of the upper-level controller 20 determines, based on the three-dimensional positions of the light points m that have been measured, whether the scanner coordinate system Cs and the camera coordinate system Cc have been calibrated relative to each other normally. When the coordinate system calibration has not been performed normally (step S130: NO), the procedure returns to step S10, and the processings at and after step S10 are performed again. When the coordinate system calibration has been performed normally (step S130: YES), the procedure proceeds to step S140.

At step S140, the second calibration part 26 of the upper-level controller 20 performs an inter-camera calibration between the calibrated camera coordinate system Cc of the camera 3 and the camera coordinate system Cc of another camera 3. Thus, the flow of the procedure ends.

Figure 10:
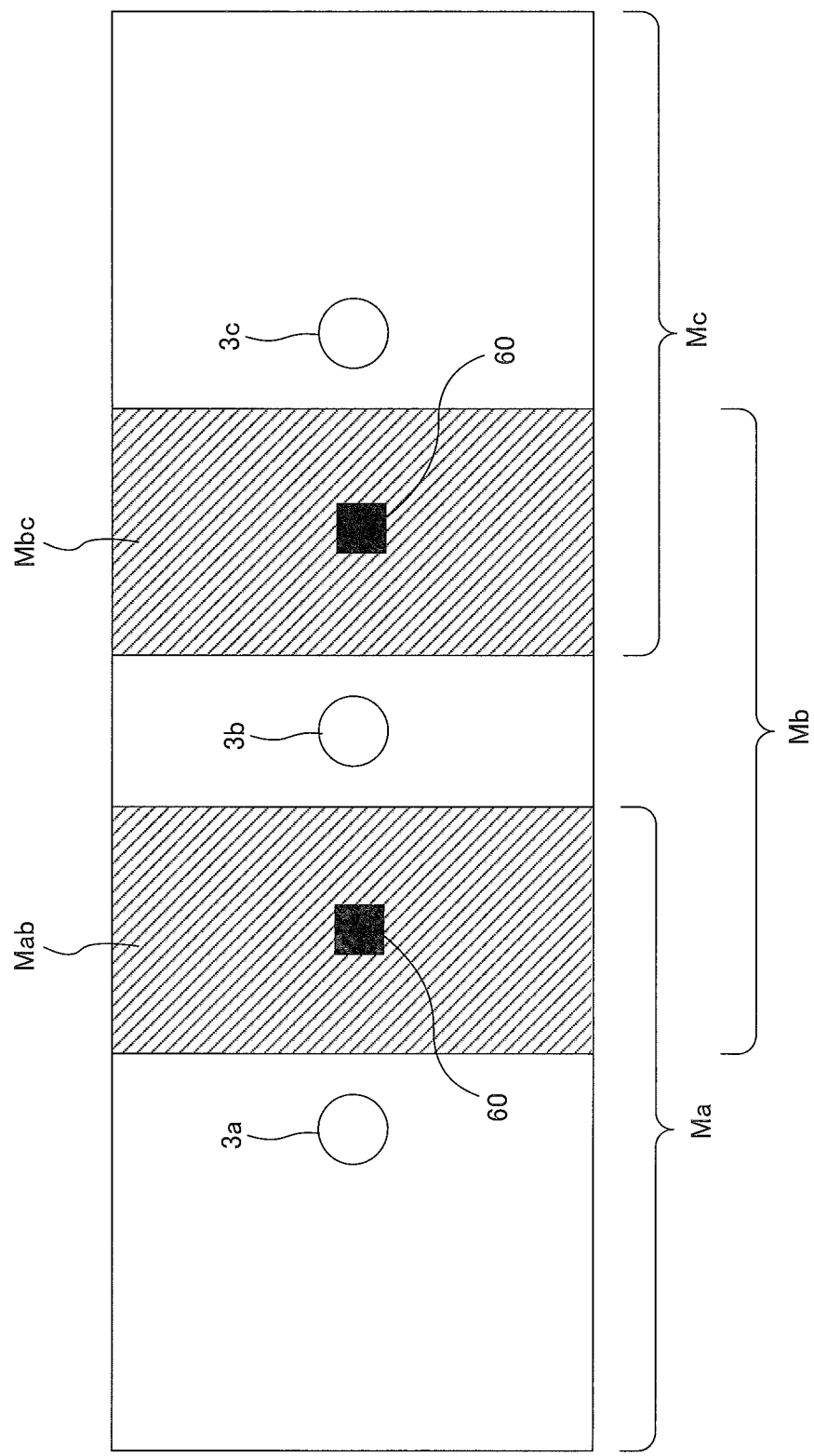
FIG. 10 illustrates an example inter-camera calibration.

By referring to FIG. 10, the inter-camera calibration will be described. As illustrated in FIG. 10, the three cameras, 3a, 3b, and 3c, are aligned in the conveyance direction of the conveyor 2. The intervals between the cameras 3a, 3b, and 3c are such that the field of vision, Ma, of the camera 3a and the field of vision, Mb, of the camera 3b overlap to form a predetermined area of region Mab, and that the field of vision Mb of the camera 3b and the field of vision, Mc, of the camera 3c overlap to form a predetermined area of region Mbc.

In the region Mab, a marker 60 is located. The marker 60 is an object common to the camera 3a and the camera 3b. The cameras 3a and 3b take images of the marker 60 to measure its position. Based on the images, the camera coordinate systems of the cameras 3a and 3b are calibrated relative to each other. The same applies to the camera 3b and the camera 3c. This ensures that only one of the cameras 3a to 3c needs to be calibrated relative to the scanner coordinate system Cs, that is, the other two cameras need not be calibrated relative to the scanner coordinate system Cs.

7. Advantageous Effects of the Embodiment

As has been described hereinbefore, the calibrating method according to this embodiment is for calibrating the scanner coordinate system Cs of the laser scanner 30 and the camera coordinate system Cc of the camera 3. The calibrating method includes: radiating, using the laser scanner 30, calibration laser light to the plate 50 such that the calibration laser light has a predetermined pattern in the scanner coordinate system Cs; changing a first position of the plate 50 to a second position with the light points m projected on the surface of the plate 50; taking, using the cameras 3, images of the light points m with the plate 50 located at the first and second positions; and calculating a positional relationship between the scanner coordinate system Cs and the camera coordinate system Cc based on three-dimensional positions of the light points m in the camera coordinate system Cc, the three-dimensional positions being obtained based on the images taken by the cameras 3. This configuration provides advantageous effects, some of which are described below.

Thus, in this embodiment, calibration laser light is radiated to the plate 50 in a predetermined pattern, and images of the light points m projected on the surface of the plate 50 are taken while the position of the plate 50 is being changed. In this manner, three-dimensional positions of the light points m are measured. These steps are repeated to obtain three-dimensional point groups constituting the predetermined pattern of the laser light. This ensures that a positional relationship between the scanner coordinate system Cs and the camera coordinate system Cc is calculated by comparing the predetermined pattern in the scanner coordinate system Cs with the three-dimensional point groups in the camera coordinate system Cc.

This configuration eliminates the need for such a physical prerequisite that the plate 50 be located so that the radiation position specified in the scanner coordinate system Cs matches the position of the actual radiation trace. This makes the coordinate system calibration between the laser scanner 30 and the camera 3 more accurate and easier to perform. The above configuration also eliminates the need for mechanically fixing the positional relationship between the camera 3 and the laser scanner 30, resulting in lowered cost and simplified apparatus configuration.

Also in this embodiment, at the time when the positional relationship is calculated, regression lines are calculated based on the three-dimensional positions of the plurality of light points m. Then, the laser-light control origin P0 is calculated based on the intersection of the regression lines.

This ensures that the laser-light control origin P0 is calculated highly accurately, resulting in increased accuracy of the calibration of the scanner coordinate system Cs and the camera coordinate system Cc relative to each other.

Also in this embodiment, at the time when the positional relationship is calculated, the base vectors of the galvanic coordinate system Cg are calculated based on the regression lines, with the origin of the galvanic coordinate system Cg set at the control origin P0.

This ensures that the base vectors of the galvanic coordinate system Cg are calculated highly accurately, resulting in increased accuracy of the calibration of the scanner coordinate system Cs and the camera coordinate system Cc relative to each other performed based on the galvanic coordinate system Cg.

Also in this embodiment, the predetermined pattern is a rectangular pattern on a surface perpendicular to the Z axis of the scanner coordinate system Cs. This configuration provides advantageous effects, some of which are described below.

In this embodiment, a quadrangular pyramid connecting the control origin P0 to a rectangle is formed. The rectangle has one pair of sides, one having ends at the points Q1 and Q4 and the other having ends at the points Q2 and Q3. The rectangle has another pair of sides, one having ends at the points Q1 and Q2 and the other having ends at the points Q3 and Q4. The points Q1 and Q4 differ in the X coordinate and are the same in the Y coordinate; similarly, the points Q2 and Q3 differ in the X coordinate and are the same in the Y coordinate. The points Q1 and Q2 differ in the Y coordinate and are the same in the X coordinate; similarly, the points Q3 and Q4 differ in the Y coordinate and are the same in the X coordinate. With this configuration, the X-axis base vector and a Y-axis base vector on each side are obtained. The Z-axis base vector is obtained by calculating the sum of (or averaging) the four vectors p1, p2, p3, and p4, which respectively connect the apexes Q1, Q2, Q3, and Q4 of the rectangle to the control origin P0. In this manner, the base vectors are calculated more easily.

Also in this embodiment, after the positional relationship between the scanner coordinate system Cs and the camera coordinate system Cc has been calculated, a predetermined radiation position is specified in the camera coordinate system Cc, and laser light is radiated to the predetermined radiation position to determine, based on the three-dimensional positions of the light points m (which have been obtained based on the images taken by the cameras 3), whether the scanner coordinate system Cs and the camera coordinate system Cc have been calibrated relative to each other normally.

This ensures that whether the coordinate system calibration has been performed normally is checked, and that if the coordinate system calibration has not been performed normally, the calibration is repeated. This further increases the accuracy of the calibration, resulting in improved reliability of the calibration.

Also in this embodiment, when a determination has been made that the scanner coordinate system Cs and the camera coordinate system Cc have been calibrated relative to each other normally, the calibrated camera coordinate system Cc of the camera 3 and the camera coordinate system Cc of another camera 3 whose field of vision overlaps the field of vision of the calibrated camera 3. This configuration provides advantageous effects, some of which are described below.

The field of vision Ma of the camera 3a and the field of vision Mb of the camera 3b overlap to form the region Mab. The cameras 3a and 3b take images of the common marker 60 in the region Mab. Based on the images, the camera coordinate systems of the cameras 3a and 3b are calibrated relative to each other. Thus, after the laser scanner 30 and, for example, the camera 3a are calibrated relative to each other, the camera coordinate system of the one camera and the camera coordinate system of another camera are calibrated relative to each other. This saves the labor of calibrating the camera coordinate systems of the other cameras 3b and 3c relative to the laser scanner 30, making the calibration work easier to perform.

Also in this embodiment, the cameras 3 are monocular cameras, and the monocular cameras take images of the light points m such that the light points m are projected on the surface of the plate 50 on which markers 51 are arranged in a predetermined pattern. This configuration provides advantageous effects, some of which are described below.

In this embodiment, the monocular camera 3 is used to measure three-dimensional positions of the light points by "perspective distortion matching processing". This configuration reduces the number of cameras as compared with the case where a plurality of stereo cameras are used to measure three-dimensional positions of the light points. The above configuration also makes the calibration work easier to perform.

Also in this embodiment, the laser scanner 30 switchably radiates calibration laser light and machining laser light coaxial to the calibration laser light. With this configuration, a calibration is performed using the calibration laser light, and then the calibration laser light is switched to the machining laser light to perform laser machining based on the result of the calibration.

8. Example Hardware Configuration of Upper-level Controller

By referring to FIG. 11, an example hardware configuration of the upper-level controller 20 will be described. It is to be noted that the robot controller 15 and the laser controller 40 each may have a hardware configuration similar to the hardware configuration illustrated in FIG. 11.

Figure 11:
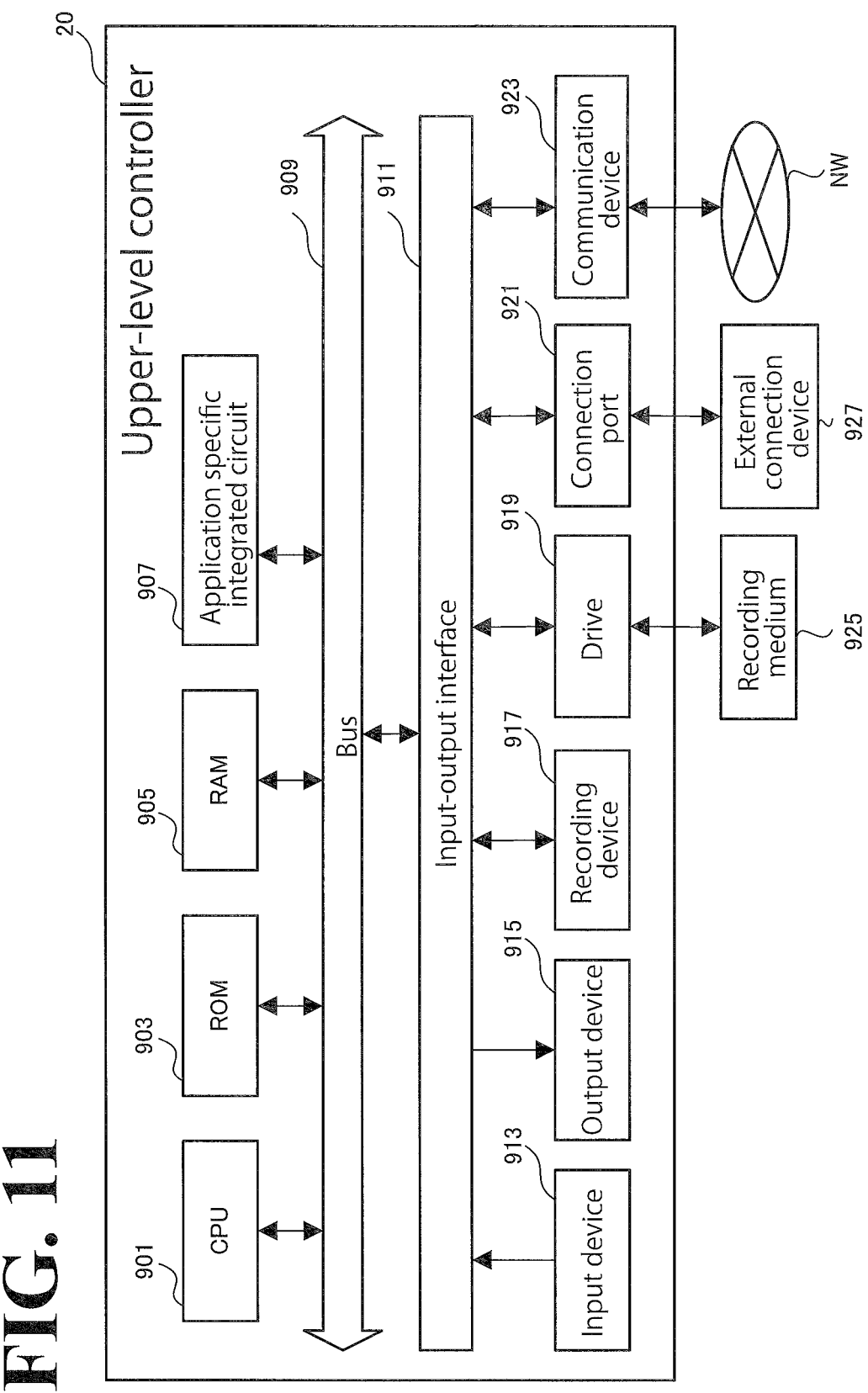
FIG. 11 is a diagram illustrating an example hardware configuration of a controller.

As illustrated in FIG. 11, the upper-level controller 20 includes the CPU 901, a ROM 903, a RAM 905, an application specific integrated circuit 907, an input device 913, an output device 915, a recording device 917, a drive 919, a connection port 921, and a communication device 923. Examples of the application specific integrated circuit 907 include, but are not limited to, an application specific integrated circuit (ASIC) and a field-programmable gate array (FPGA). These configurations are connected to each other through a bus 909 and an input-output interface 911 so that signals are transmittable to and from the configurations.

The programs may be stored in, for example, the ROM 903, the RAM 905, or the recording device 917. The recording device 917, a non-limiting example of which is a hard disc, serves as the storage 28, for example.

In another possible embodiment, the programs may be stored in a removable recording medium 925 temporarily or permanently. Examples of the recording medium 925 include, but are not limited to, a magnetic disc such as a flexible disc; an optical disc such as a compact disc (CD), a magneto-optical (MO) disc, and a digital video disc (DVD); and a semiconductor memory. The recording medium 925 may be provided in the form of "packaged software". In this case, the programs stored in the recording medium 925 may be read by the drive 919 and stored in the recording device 917 through devices such as the input-output interface 911 and the bus 909.

In another possible embodiment, the programs may be stored in a download site or any other recording device such as a computer (not illustrated). In this case, the programs are transmitted to the communication device 923 through a network NW. Examples of the network NW include, but are not limited to, a local area network (LAN) and the Internet. Then, the programs received by the communication device 923 are stored in the recording device 917 through devices such as the input-output interface 911 and the bus 909.

In another possible embodiment, the programs may be stored in an external connection device 927. In this case, the programs are transmitted through the connection port 921 and stored in the recording device 917 through devices such as the input-output interface 911 and the bus 909.

Then, the CPU 901 performs various kinds of processing based on the programs stored in the recording device 917 so as to implement the processings performed at the elements such as the first calibration part 25, the second calibration part 26, and the calibration determination part 27. In executing the programs, the CPU 901 may read the programs directly from the recording device 917 or may temporarily load the programs in the RAM 905. When the CPU 901 receives the programs through devices such as the communication device 923, the drive 919, and the connection port 921, the CPU 901 may execute the programs without storing the programs in the recording device 917.

As necessary, the CPU 901 may perform the various kinds of processing based on signals or information input through the input device 913, such as a mouse, a keyboard, and a microphone (not illustrated).

Then, the CPU 901 may output results of the processings from the output device 915, such as a display device and a sound output device. As necessary, the CPU 901 may send results of the processings through the communication device 923 and the connection port 921 and store the results of the processings in the recording device 917 and/or the recording medium 925.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

While in the above-described embodiment a single circuit may be used to serve as the processing parts of the upper-level controller 20, this configuration is not intended in a limiting sense; it is also possible to use a plurality of circuits to perform the respective processing parts of the upper-level controller 20. While in the above-described embodiment a single circuit may be used to serve as the processing parts of the laser controller 40, this configuration is not intended in a limiting sense; it is also possible to use a plurality of circuits to perform the respective processing parts of the laser controller 40. While in the above-described embodiment a single circuit may be used to serve as the processing parts of the robot controller 15, this configuration is not intended in a limiting sense; it is also possible to use a plurality of circuits to perform the respective processing parts of the robot controller 15.

Otherwise, the above-described embodiment and modification may be combined in any manner deemed suitable. Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A calibrating method comprising:
    controlling a laser radiator to radiate calibration laser light to an object such that a pattern is projected in a laser coordinate system with respect to the laser radiator;
    controlling a camera to obtain a first image of first light points of the calibration laser light projected on a surface of the object when the object is in a first position;
    calculating, based on the first image, three-dimensional positions of the first light points in a camera coordinate system with respect to the camera;
    changing a position of the object from the first position to a second position;
    controlling the camera to obtain a second image of second light points of the calibration laser light projected on the surface of the object when the object is in the second position;
    calculating, based on the second image, three-dimensional positions of the second light points in the camera coordinate system; and
    calculating a positional relationship between the laser coordinate system and the camera coordinate system based on the three-dimensional positions of the first light points and the three-dimensional positions of the second light points,
    wherein the step of calculating the positional relationship comprises
        calculating regression lines based on the three-dimensional positions of the first light points and the second light points, and
        calculating a control origin of the calibration laser light based on an intersection of the regression lines.

2. The calibrating method according to claim 1, wherein the step of calculating the positional relationship comprises calculating, based on the regression lines, a base vector of the laser coordinate system with the control origin serving as an origin of the laser coordinate system.

3. The calibrating method according to claim 1, wherein the pattern comprises a rectangular pattern on a surface perpendicular to a Z axis of the laser coordinate system.

4. The calibrating method according to claim 1, further comprising, after calculating the positional relationship between the laser coordinate system and the camera coordinate system, specifying a radiation position in the camera coordinate system and radiating the calibration laser light to the radiation position to determine, based on the three-dimensional positions of the first light points and the second light points, whether the laser coordinate system and the camera coordinate system have been calibrated relative to each other normally.

5. The calibrating method according to claim 4, further comprising, when a determination has been made that the laser coordinate system and the camera coordinate system have been calibrated relative to each other normally, calibrating the calibrated camera coordinate system of the camera and a camera coordinate system of another camera relative to each other, the camera and the another camera having overlapping fields of vision.

6. The calibrating method according to claim 1,
    wherein the camera comprises a monocular camera, and
    wherein the object comprises a plate having a surface which has markers arranged in a pattern and on which the calibration laser light is radiated.

7. The calibrating method according to claim 1, wherein the laser radiator is configured to switchably radiate the calibration laser light and machining laser light coaxial to the calibration laser light.

8. The calibrating method according to claim 1, wherein the predetermined pattern comprises a rectangular pattern on a surface perpendicular to a Z axis of the laser coordinate system.

9. The calibrating method according to claim 1, wherein the pattern has a substantially constant pattern in the laser coordinate system when the object is in the first position and the second position.

10. The calibrating method according to claim 1, further comprising, after calculating the positional relationship between the laser coordinate system and the camera coordinate system, specifying a predetermined radiation position in the camera coordinate system and radiating the calibration laser light to the predetermined radiation position to determine, based on the three-dimensional positions of the light points, whether the laser coordinate system and the camera coordinate system have been calibrated relative to each other normally.

11. A calibration apparatus comprising:
    circuitry configured to:
        control a laser radiator to radiate calibration laser light to an object such that a pattern is projected in a laser coordinate system with respect to the laser radiator;
        control a camera to obtain a first image of first light points of the calibration laser light projected on a surface of the object when the object is in a first position;

calculate, based on the first image, three-dimensional positions of the first light points in a camera coordinate system with respect to the camera;

change a position of the object from the first position to a second position;

control the camera to obtain a second image of second light points of the calibration laser light projected on the surface of the object when the object is in the second position;

calculate, based on the second image, three-dimensional positions of the second light points in the camera coordinate system; and calculate a positional relationship between the laser coordinate system and the camera coordinate system based on the three-dimensional positions of the first light points and the three-dimensional positions of the second light points, wherein the circuitry is configured to calculate regression lines based on the three-dimensional positions of the first light points and the second light points, and configured to calculate a control origin of the calibration laser light based on an intersection of the regression lines.

12. The calibration apparatus according to claim 11, wherein the circuitry is configured to calculate, based on the regression lines, a base vector of the laser coordinate system with the control origin serving as an origin of the laser coordinate system.

13. The calibration apparatus according to claim 11, wherein the pattern comprises a rectangular pattern on a surface perpendicular to a Z axis of the laser coordinate system.

14. The calibration apparatus according to claim 11, wherein the circuitry is configured to, after calculating the positional relationship between the laser coordinate system and the camera coordinate system, specifying a radiation position in the camera coordinate system and radiating the calibration laser light to the radiation position to determine, based on the three-dimensional positions of the first light points and the second light points, whether the laser coordinate system and the camera coordinate system have been calibrated relative to each other normally.

15. The calibration apparatus according to claim 14, wherein the circuitry is configured to, when the circuitry has determined that the laser coordinate system and the camera coordinate system have been calibrated relative to each other normally, calibrate the calibrated camera coordinate system of the camera and a camera coordinate system of another camera relative to each other, the camera and the another camera having overlapping fields of vision.

16. The calibration apparatus according to claim 11,
wherein the camera comprises a monocular camera, and
wherein the object comprises a plate having a surface which has markers arranged in a pattern and on which the calibration laser light is radiated.

17. The calibration apparatus according to claim 11, wherein the circuitry is configured to control the laser radiator to switch the calibration laser light to machining laser light coaxial to the calibration laser light and configured to radiate the machining laser light.

18. The calibration apparatus according to claim 11, wherein the pattern has a substantially constant pattern in the laser coordinate system when the object is in the first position and the second position.

* * * * *